Aug. 9, 1932.  H. Z. COBB  1,870,986
METHOD OF MAKING WHEELS
Filed Nov. 29, 1929
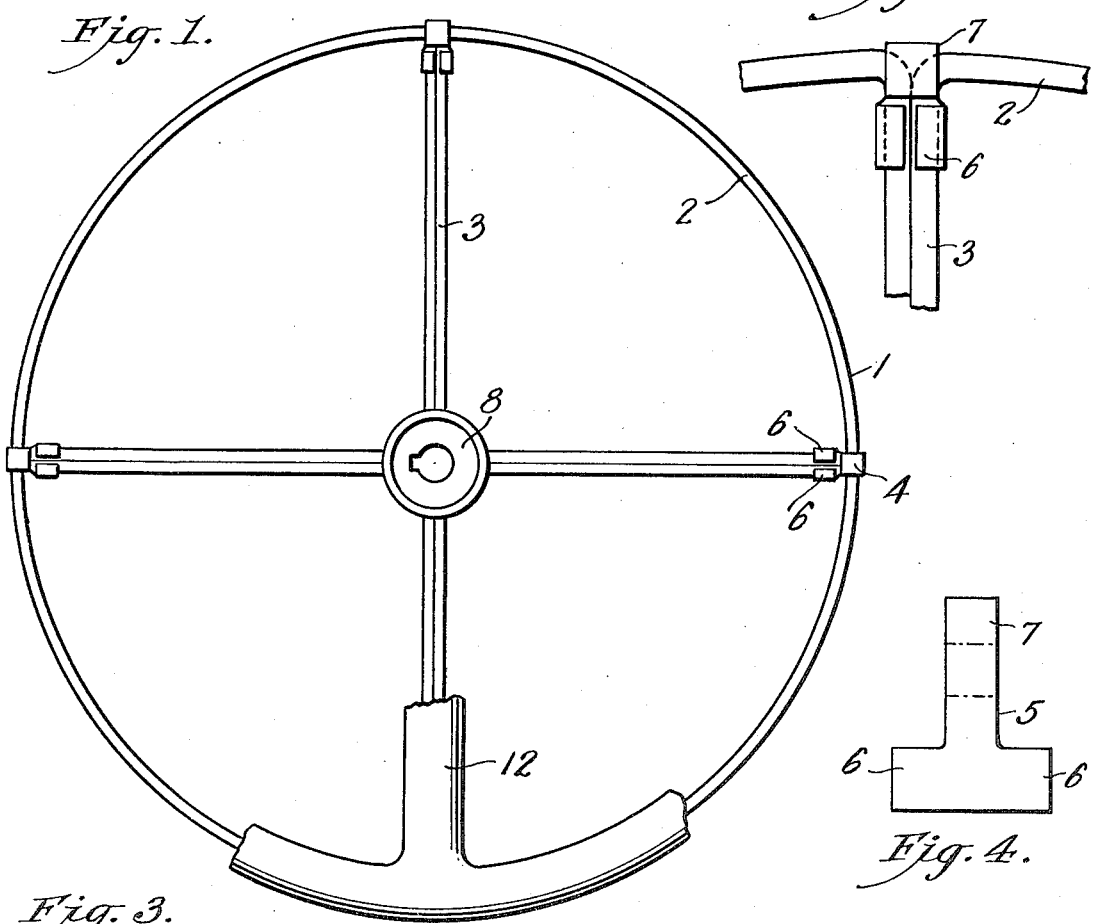
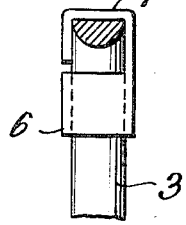
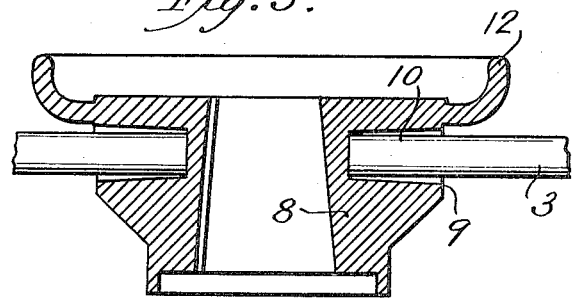
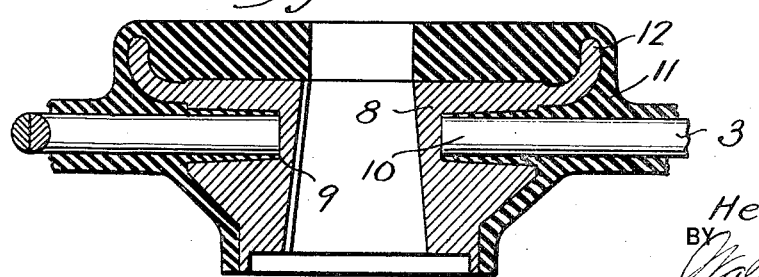
INVENTOR
Henry Z. Cobb
BY
ATTORNEY Patented Aug. 9, 1932

1,870,986

UNITED STATES PATENT OFFICE

HENRY Z. COBB, OF PROVIDENCE, RHODE ISLAND, ASSIGNOR TO REVERE RUBBER COMPANY, OF CHELSEA, MASSACHUSETTS, A CORPORATION OF RHODE ISLAND

METHOD OF MAKING WHEELS

Application filed November 29, 1929. Serial No. 410,387.

This invention relates to steering wheels and the method of making the same.

This invention has for its object to provide a novel steering wheel construction which employs a minimum number of like parts and permits of economical and rapid manufacture. It is also an object of this invention to provide a steering wheel having greater strength than steering wheels heretofore produced, especially in those portions thereof which are associated with the hub of the wheel. It is also an object of this invention to provide a novel method of manufacturing steering wheels which involves a relatively small number of operations and by which the hub and frame are more easily assembled in proper relation. It is also an object of this invention to provide a novel method of manufacturing steering wheels in which the frame and hub are united at the same time that the moldable material is applied over the frame. Other objects and advantages of the present invention will appear in the following detailed description taken in connection with the accompanying drawing, in which:

Fig. 1 is a plan view, partly broken away, of the steering wheel of this invention;

Fig. 2 is a detail view showing the clip for holding the units of the frame together;

Fig. 3 is a detail view of the clip shown in Fig. 2;

Fig. 4 is a detail view of the blank from which the clip is made;

Fig. 5 is a detail view in cross section showing the hub and spokes of the frame in assembled relation;

Fig. 6 is a detail view in section of the hub and frame united.

According to this invention the frame of the steering wheel is preferably made up of a plurality of units 1, in this instance four, which have rim portions 2 and spoke portions 3. The units 1 preferably are made of half round wire bent to the shape shown in the drawing. The number of units is determined by the arc covered by the rim portion of each unit. Any number of units may be employed and the cross section of the wire forming the unit may be any desired shape.

When the units 1 are arranged in assembled relation they interfit so that the spoke portions 3 are in parallel juxtaposed relation and form the spokes of the frame of the wheel, and the rim portions 2 of the units form a continuous rim. This construction of steering wheel frame is the same as that disclosed in my copending applications Serial Nos. 343,039, and 359,445, filed Feb. 27, 1929, and May 1, 1929, respectively.

According to this invention the units 1 of which the steering wheel frame are composed are secured together by a clip 4. The clip 4 is made from the sheet metal blank 5 shown in Fig. 4. The sheet metal blank 5 has arms 6 which are bent around the spokes of the frame and serve to clamp the spokes together. The blank 5 also has a tongue 7 which is folded over the rim at the point of junction between the spokes and rim as shown in Figs. 2 and 3. It is clear from this construction of clip that the units are held against displacement in any direction, and that the clip is fixed in position at the rim extremity of the spokes and at the junction between the rim and spokes. While one form of clip is shown by way of illustration, it is not intended to limit this invention thereto, for it will be apparent to one skilled in the art that the clip may be modified in many ways and for the purposes of this invention it is only necessary that the clip have a portion extending around the spoke to hold the spoke portions of the frame 1 together and having a part which extends over or around the rim.

The frame of the steering wheel is provided with hub 8 which has recesses 9 into which the extremities 10 of the spokes fit. The recesses 9 are of such dimensions that the extremities 10 of the spokes fit loosely therein, and this result may be achieved by making the bore of the recesses larger than the diameter of the spoke throughout the length of the recesses, or by forming the recesses with a taper as shown in Fig. 5. The spokes of the frame are united to the hub by a plastic material 11 which preferably consists of hard rubber, which plastic material is forced into the recesses 9 and about the extremities 10 of the spokes. When the plastic material 11 is set or vulcanized, it forms a rigid joint between the extremities 10 of the spokes and the hub 8. Any suitable plastic material may be employed for forming this union so long as it may be caused to set and form a hard substance after it has been forced into the recesses. Although hard rubber is preferred for this purpose, bakelite or other plastics may be employed.

Preferably the hub 8 is provided with a flange 12 which overlies those portions of the spokes adjacent the hub. The moldable composition 11 which extends into the recesses 9 also covers the spokes of the frame and extends about the flange 12 so as to embed it therein. The plastic material 11 when set serves to form a rigid union between the flange 12 and those portions of the spokes adjacent the hub so that a more rigid construction of steering wheel is obtained, and the liability of the spokes loosening in the hub is reduced. The flange 12 is shown in the form of a cup, although other suitable shapes may be employed, for instance the flange 12 may be shaped so as to extend parallel with the spokes, if desired.

According to the method of this invention, the steering wheel frame is assembled in any suitable manner and the extremities 10 of the spokes of the frame are assembled in the recesses 9 of the hub. Inasmuch as the spokes fit loosely into the recesses 9, the frame is free to tilt to a limited extent in any direction relative to the hub. The assembled frame and hub are then inserted into a suitable mold along with the plastic composition which preferably is unvulcanized hard rubber composition. The mold is then closed so as to embed the frame and hub in the rubber and at the same time to fix the hub and frame in proper position relative to each other. The plastic composition is then set or vulcanized thereby forming the rigid unit in which the frame and hub are secured together by the composition, and in which the frame and hub are assembled in proper relation by the molding operation. It is obvious that so far as the method of this invention is concerned the frame of the wheel may be of any suitable construction so long as it has spokes and the hub may be of any suitable construction, so long as it has recesses loosely to receive the extremities of the spokes. The flange 12 may be eliminated if desired but in the preferred form of the invention the flange is employed to prevent the rubber from shrinking out of true alignment after the wheel is taken out of the mold. For instance the type of frame disclosed in my Patent No. 1,822,516, issued September 8, 1931, may be used in connection with the type of hub and method of assembling disclosed herein.

Whereas certain forms of this invention have been described by way of illustration, it is not intended so to limit this invention inasmuch as changes in the details thereof may be made without departing from the scope of this invention as defined in the following claims.

Having thus described my invention, what I claim and desire to protect by Letters Patent is:

1. A wheel frame composed of units having a rim portion and spoke portions, said units being arranged in interfitting relation with the spoke portions of the units forming the spokes of the frame, clips extending around the spokes and having a tongue extending around the rim at the junction of the rim and the spokes, and a hub carried by the spokes.

2. A steering wheel frame composed of a plurality of like units, said units having spoke portions and rim portions, the spoke portions interfitting when in assembled relation to form the spokes of the frame, clips at the junction between the spokes and rim of the frame for securing the units together, said clips having a ring extending around the spoke and a tongue extending around the rim.

3. A steering wheel having a frame provided with spokes, a hub provided with recesses adapted loosely to receive the extremities of the spokes, said hub having a flange overlying the spokes, and a molded composition covering the spokes, the flange, and extending into the recesses.

4. A steering wheel having a frame provided with spokes, a hub provided with recesses adapted loosely to receive the extremities of the spokes, said hub having a flange overlying the spokes, and hard rubber covering the spokes, the flange, and extending into the recesses.

5. A wheel having a frame provided with spokes, a hub provided with recesses adapted loosely to receive the extremities of the spokes, hard rubber covering the frame and surrounding the extremities of the spokes within the recesses.

6. A wheel having a frame provided with spokes, a hub provided with recesses adapted loosely to receive the extremities of the spokes, said hub having a cup shaped flange overlying the spokes, hard rubber covering the frame, embedding the flange therein, and surrounding the extremities of the spokes within the recesses.

7. A wheel having a frame composed of a plurality of units having spoke portions and rim portions, the spoke portions forming the spokes of the frame when the units are in assembled relation, a clip arranged at the junction between the spokes and rim to secure the units together in assembled relation, a hub having recesses adapted loosely to receive the extremities of the spokes, molded material covering the frame and extending into the recesses of the hub.

8. A wheel having a frame composed of a plurality of units having spoke portions and rim portions, the spoke portions forming the spokes of the frame when the units are in assembled relation, a clip arranged at the junction between the spokes and rim to secure the units together in assembled relation, a hub having recesses adapted loosely to receive the extremities of the spokes, and having a flange overlying the spokes, hard rubber composition covering the frame and embedding the flange therein and extending into the recesses.

Signed at Providence, county of Providence, State of Rhode Island, this 22nd day of November, 1929.

HENRY Z. COBB.